United States Patent
Wada et al.

(10) Patent No.: US 10,508,052 B2
(45) Date of Patent: Dec. 17, 2019

(54) TUBE GLASS CUTTING METHOD AND CUTTING DEVICE, AND TUBE GLASS PRODUCT MANUFACTURING METHOD

(71) Applicant: Nippon Electric Glass Co., Ltd., Shiga (JP)

(72) Inventors: Masanori Wada, Shiga (JP); Masato Inoue, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 196 days.

(21) Appl. No.: 15/738,735

(22) PCT Filed: Mar. 30, 2016

(86) PCT No.: PCT/JP2016/060308
§ 371 (c)(1),
(2) Date: Dec. 21, 2017

(87) PCT Pub. No.: WO2016/208248
PCT Pub. Date: Dec. 29, 2016

(65) Prior Publication Data
US 2018/0186679 A1    Jul. 5, 2018

(30) Foreign Application Priority Data

Jun. 25, 2015 (JP) ................. 2015-127831
Dec. 17, 2015 (JP) ................. 2015-246329

(51) Int. Cl.
*C03B 33/06* (2006.01)
*C03B 33/095* (2006.01)
(Continued)

(52) U.S. Cl.
CPC .......... *C03B 33/0955* (2013.01); *B23K 26/38* (2013.01); *B23K 2101/06* (2018.08); *B23K 2103/54* (2018.08)

(58) Field of Classification Search
CPC ........ B23K 26/38; B23K 26/53; C03B 33/06; C03B 33/102
See application file for complete search history.

(56) References Cited

U.S. PATENT DOCUMENTS

| | | | |
|---|---|---|---|
| 6,055,829 A | 5/2000 | Witzmann et al. | |
| 2004/0002199 A1* | 1/2004 | Fukuyo | B23K 26/03 438/460 |

(Continued)

FOREIGN PATENT DOCUMENTS

| | | |
|---|---|---|
| CN | 103313946 | 9/2013 |
| JP | 11-71124 | 3/1999 |

(Continued)

OTHER PUBLICATIONS

International Preliminary Report on Patentability and Written Opinion of the International Searching Authority dated Dec. 26, 2017 in International (PCT) Application No. PCT/JP2016/060308.

(Continued)

*Primary Examiner* — Cynthia Szewczyk
(74) *Attorney, Agent, or Firm* — Wenderoth, Lind & Ponack, L.L.P.

(57) ABSTRACT

With a method of cutting a tube glass (G1) according to the present invention, the tube glass (G1) is irradiated with laser light (L) having a focal point (F) adjusted to an inside of the tube glass (G1), to thereby form an inner crack region (C1) including one or more cracks in a portion of the tube glass (G1) in a circumferential direction of the tube glass (G1) through multiphoton absorption that occurs in an irradiation region of the laser light (L). Then, in the tube glass (G1), there is generated a stress that urges the one or more cracks in the inner crack region (C1) to propagate in the circumferential direction of the tube glass (G1) to cause the one or more cracks to propagate throughout an entire circumfer- (Continued)

ence of the tube glass (G1), to thereby cut the tube glass (G1).

20 Claims, 13 Drawing Sheets

(51) Int. Cl.
*B23K 26/38* (2014.01)
*B23K 101/06* (2006.01)
*B23K 103/00* (2006.01)

(56) References Cited

U.S. PATENT DOCUMENTS

| | | | |
|---|---|---|---|
| 2005/0173387 A1* | 8/2005 | Fukuyo | B23K 26/03 219/121.67 |
| 2013/0183775 A1* | 7/2013 | Bergmann | H01L 27/14601 438/16 |
| 2014/0054348 A1 | 2/2014 | Teranishi et al. | |
| 2015/0136743 A1* | 5/2015 | Hosseini | B23K 26/364 219/121.61 |
| 2016/0122228 A1 | 5/2016 | Teranishi et al. | |

FOREIGN PATENT DOCUMENTS

| | | |
|---|---|---|
| JP | 2002-205181 | 7/2002 |
| JP | 2007-99587 | 4/2007 |
| JP | 2007-167875 | 7/2007 |
| JP | 2013-129546 | 7/2013 |
| JP | 2013-159532 | 8/2013 |

OTHER PUBLICATIONS

International Search Report dated Jun. 28, 2016 in International (PCT) Application No. PCT/JP2016/060308.
Office Action dated Sep. 3, 2019 in counterpart Chinese Patent Application No. 2016800346045, with English translation of the Chinese Search Report.

* cited by examiner

PORTION A

TUBE GLASS CUTTING METHOD AND CUTTING DEVICE, AND TUBE GLASS PRODUCT MANUFACTURING METHOD

TECHNICAL FIELD

The present invention relates to a method of cutting a tube glass and a cutting device for a tube glass, and a method of manufacturing a tube glass product.

BACKGROUND ART

A tube glass product used in, for example, a medical ampule and a fluorescent tube for lighting is formed by various methods such as a Danner method and a down-draw method. The overview of the Danner method is described below as an example.

When a tube glass product is manufactured by the Danner method, a molten glass is first supplied to a rotatable sleeve arranged in a muffle furnace. The supplied molten glass is formed into a tube shape while being wound on an inside of the sleeve. Then, the molten glass formed into a tube shape is pulled out from a distal end of the sleeve with a tube drawing device (pulling device) to form a tube glass continuously. After that, the formed tube glass (continuous tube glass) is cut to a predetermined length with a cutting device to obtain a tube glass product having a predetermined length (see, for example, Patent Literature 1).

Further, in this case, as a method of cutting the continuous tube glass, there has been generally adopted a method involving bringing a cutting blade into contact with an outer peripheral surface of the continuous tube glass that is conveyed continuously to form scratches on the outer peripheral surface, and applying thermal shock to the scratches, to thereby cut the continuous tube glass (see, for example, Patent Literature 2).

CITATION LIST

Patent Literature 1: JP 2013-159532 A
Patent Literature 2: JP 2013-129546 A

SUMMARY OF INVENTION

Technical Problem

The method described in Patent Literature 2 enables the continuous tube glass to be cut while being conveyed. Therefore, the method described in Patent Literature 2 is excellent in that the continuous tube glass can be cut at a relatively high speed, and the method can be easily incorporated into a manufacturing line. However, in the method involving forming scratches on the outer peripheral surface of the continuous tube glass and causing the scratches to propagate through thermal shock as described above, it is difficult to stabilize the shape of the scratches serving as a starting point of cracks, and hence a fracture surface (cut surface) is rough, with the result that the fracture surface is finished with unsatisfactory quality. Further, cutting processing for finishing the fracture surface in a flat shape is additionally required, resulting in an increase in number of processes. Further, in the method involving forming scratches on the outer peripheral surface of the tube glass, glass powder is inevitably generated, and hence the step of cleaning the glass powder adhering to the inner peripheral surface of the tube glass after being cut is also separately required.

In view of the above-mentioned circumstances, in this description, a first technical object to be achieved by the present invention is to provide a method of cutting a tube glass and a cutting device for a tube glass, which enable satisfactory quality of a cut surface and are capable of preventing generation of glass powder in spite of cutting the tube glass at a high speed.

Further, in view of the above-mentioned circumstances, in this description, a second technical object to be achieved by the present invention is to provide a method of manufacturing a tube glass product, which enables satisfactory quality of a cut surface and is capable of preventing generation of glass powder in spite of cutting the tube glass at a high speed.

Solution to Problem

The first technical object is achieved by a method of cutting a tube glass according to the present invention. That is, the method of cutting a tube glass comprises: irradiating the tube glass with laser light having a focal point adjusted to an inside of the tube glass, to thereby form an inner crack region including one or more cracks in a portion of the tube glass in a circumferential direction of the tube glass through multiphoton absorption that occurs in an irradiation region of the laser light; and generating, in the tube glass, a stress that urges the one or more cracks in the inner crack region to propagate in the circumferential direction of the tube glass to cause the one or more cracks to propagate throughout an entire circumference of the tube glass, to thereby cut the tube glass.

In the present invention, the inner crack region is formed in the tube glass through multiphoton absorption that occurs at a time of irradiation with laser light, and the cracks in the inner crack region are caused to propagate to cut the tube glass. Therefore, the situation in which glass powder similar to scratches is generated during formation of an initial crack (crack in the inner crack region) can be avoided. Therefore, the time and labor for removing the glass powder by cleaning can be omitted to reduce the number of required processes. Further, in the present invention, the stress that urges the cracks in the inner crack region to propagate in the circumferential direction of the tube glass is generated in the tube glass, to thereby cause the cracks to propagate throughout the entire circumference of the tube glass. Therefore, an entire region of a cut surface can be formed of fracture surfaces of the cracks in the inner crack region formed through multiphoton absorption of the laser light and fracture surfaces of the cracks that propagate from the inner crack region. When the cut surface is formed as described above, as compared to the case in which cracks are forcibly generated and caused to propagate by cleaving or the like, the occurrence of cracking, chipping, and the like can be prevented to the extent possible to control the properties of the cut surface with relatively high precision, with the result that the cut surface with satisfactory properties can be obtained stably. Further, as described above, when the inner crack region is formed in the portion of the tube glass in the circumferential direction thereof with the laser light, and the cracks in the inner crack region are caused to propagate in the circumferential direction of the tube glass, a time period required for cutting becomes shorter as compared to the case in which the inner crack region is formed throughout an entire circumference by irradiation with laser light. Accordingly, the tube glass can be cut at a high speed, and the cutting method according to the present invention can be easily introduced into, for example, a manufacturing line.

Further, with the method of cutting a tube glass according to the present invention, the inner crack region may be formed on an outer periphery side of the tube glass in a thickness direction of the tube glass.

Further, with the method of cutting a tube glass according to the present invention, the inner crack region may be formed into an arc shape in conformity with the tube glass.

As described above, the cutting method according to the present invention involves forming the inner crack region through multiphoton absorption in the irradiation region of the laser light, and hence the forming position and shape of the inner crack region can be relatively freely set. In view of the foregoing, the inventors of the present invention have made investigations on the preferred forming position or shape of the inner crack region, and as a result, have found that the cracks are caused to propagate smoothly and accurately by forming the inner crack region on the outer periphery side of the tube glass in the thickness direction thereof at least under predetermined conditions. Alternatively, it has been found that, even when the inner crack region is formed into the arc shape in conformity with the tube glass, the subsequent propagation of the cracks can also be performed smoothly and accurately. Thus, when the inner crack region is formed so as to satisfy at least one of the above-mentioned position or shape, a pair of cracks having propagated in directions separated from each other in the circumferential direction from the inner crack region reach a common position at a time when the cracks propagate by the same distance. Accordingly, the cut surface with significantly satisfactory properties can be obtained.

Further, with the method of cutting a tube glass according to the present invention, the laser light may be caused to perform scanning so that the focal point is included in an imaginary cross section orthogonal to a center line of the tube glass.

When the laser light is caused to perform scanning as described above, the laser light can be caused to perform scanning in synchronization with the movement of the tube glass even under a state in which the tube glass is conveyed. Thus, the tube glass can be irradiated with the laser light while the focal point is moved accurately along the circumferential direction of the tube glass, with the result that the inner crack region can be formed with good precision in the portion of the tube glass in the circumferential direction.

Further, with the method of cutting a tube glass according to the present invention, the laser light may be dispersed and irradiated to a plurality of points of the inside of the tube glass so that each focal point is included in an imaginary cross section orthogonal to a center line of the tube glass.

When the laser light is dispersed and irradiated to the plurality of points of the inside of the tube glass as described above, the plurality of points of the inside of the tube glass can be simultaneously irradiated with the laser light. Therefore, in particular, when the tube glass is conveyed, the plurality of points can be irradiated with the laser light within a time period of one laser light irradiation even without performing scanning with the laser light in consideration of the conveyance speed of the tube glass (in synchronization with the tube glass), with the result that the inner crack region can be formed within a short time period.

Further, with the method of cutting a tube glass according to the present invention, the inner crack region may be formed in a vicinity of an outer peripheral surface of the tube glass by irradiation with the laser light while a surface layer portion including the outer peripheral surface is left, and the one or more cracks in the inner crack region may be caused to propagate to the outer peripheral surface. Then, the one or more cracks may be caused to propagate throughout the entire circumference of the tube glass with a stress that urges the one or more cracks to propagate in the circumferential direction of the tube glass.

The inventors of the present invention have found that, when the inner crack region is formed in the vicinity of the outer peripheral surface of the tube glass by irradiation with laser light while the surface layer portion including the outer peripheral surface is left, the cracks in the inner crack region propagate to the outer peripheral surface of the tube glass during formation of the inner crack region depending on the forming condition of the inner crack region. Further, the inventors of the present invention have found that, when the cracks propagate to the outer peripheral surface as described above, the stress required for subsequent cutting of the entire circumference of the tube glass may be small. Thus, the cut surface with even more satisfactory properties can be obtained by, as described above, adjusting the forming position of the inner crack region to cause the cracks in the inner crack region to propagate to the outer peripheral surface and causing the cracks to propagate throughout the entire circumference of the tube glass with the stress that urges the cracks to propagate in the circumferential direction of the tube glass. Needless to say, the cracks generated on the outer peripheral surface of the tube glass are the cracks in the inner crack region formed in the tube glass by irradiation with laser light, which propagate to the outer peripheral surface. Therefore, there is no risk in that at least glass powder, which may cause a problem, is not generated.

Further, in this case, with the method of cutting a tube glass according the present invention, abrasion may be generated in the surface layer portion to form a plurality of holes extending in an irradiation direction of the laser light by irradiation with the laser light, and a circumferential interval may be adjusted between the plurality of holes, to thereby cause the one or more cracks in the inner crack region to propagate to the outer peripheral surface so as to connect the plurality of holes to each other.

According to the further investigations by the inventors of the present invention, the following has been found. The propagation phenomenon of the cracks in the inner crack region toward the outer peripheral surface is caused to occur stably (with significantly high probability) by generating abrasion in the surface layer portion, in which the inner crack region is not formed, to form the plurality of holes and adjusting the circumferential interval between the plurality of holes, when the cracks in the inner crack region is caused to propagate to the outer peripheral surface of the tube glass by irradiation with laser light, as described above. Thus, the cut surface with satisfactory and stable properties can be obtained by forming the inner crack region in the tube glass, forming the plurality of holes through abrasion in the surface layer portion of the tube glass, in which the inner crack region is not formed, and adjusting the circumferential interval between the plurality of holes to an appropriate size.

Further, with the method of cutting a tube glass according the present invention, a circumferential pitch between the plurality of holes may be set so as to be 1.5 times or more and 5.0 times or less an inner diameter of the holes.

In adjustment of the circumferential interval between the plurality of holes formed in the surface layer portion through abrasion to an appropriate size as described above, for example, it is conceivable that the circumferential pitch between the plurality of holes be set within an appropriate range in relation to the inner diameter of the holes. In this case, when the circumferential pitch between the plurality of holes is set within the above-mentioned range at a magnification with respect to the inner diameter of the holes, the cracks propagate smoothly and accurately so as to connect the plurality of holes adjacent to each other in the circumferential direction. Thus, the cracks in the inner crack region can be caused to accurately propagate to the outer peripheral surface of the tube glass, and the cut surface with satisfactory and stable properties can be obtained.

Further, with the method of cutting a tube glass according to the present invention, a thickness of the surface layer portion may be set so as to be 20 µm or less.

The cracks in the inner crack region is caused to propagate smoothly and accurately toward the outer peripheral surface also by setting the thickness of the surface layer portion in which the inner crack region is not formed to a predetermined size or less, in other words, by appropriately determining the forming range (depth direction position from the outer peripheral surface) of the inner crack region. Thus, the cracks in the inner crack region can be caused to accurately propagate to the outer peripheral surface of the tube glass, and the cut surface with satisfactory and stable properties can be obtained.

Further, with the method of cutting a tube glass according to the present invention, the tube glass may be irradiated with the laser light having a focal point adjusted to an inside of the tube glass under a state of generating, in the tube glass, a stress that urges the one or more cracks in the inner crack region to propagate in the circumferential direction of the tube glass, to thereby form the inner crack region in the portion of the tube glass in the circumferential direction.

When the stress that can urge the cracks to propagate is generated in advance in the tube glass as described above, a stress distribution state that occurs in the tube glass can be more accurately reproduced as compared to, for example, the case in which the above-mentioned stress is generated immediately after the formation of the inner crack region. Further, the state in which the stress is generated is maintained more easily when the stress is generated in the tube glass by applying an external force or the like to the tube glass in advance. Thus, the cracks are caused to propagate accurately along a desired direction (circumferential direction of the tube glass), thereby being capable of stably providing the more satisfactory cut surface.

Further, with the method of cutting a tube glass according to the present invention, a tensile force may be applied to the tube glass in a direction along a longitudinal direction of the tube glass, to thereby generate the stress that urges the one or more cracks to propagate in the circumferential direction of the tube glass.

When the tensile force is applied to the tube glass along the longitudinal direction thereof as described above, the large tensile stress can be generated in a direction orthogonal to the inner crack region. Thus, it becomes easy to cause the cracks in the inner crack region to propagate in the direction orthogonal to the tensile stress, that is, along the circumferential direction of the tube glass.

Further, with the method of cutting a tube glass according to the present invention, a bending force may be applied to the tube glass so that the center line of the tube glass is curved with a predetermined curvature, to thereby generate the stress that urges the one or more cracks to propagate in the circumferential direction of the tube glass.

When the bending force is applied to the tube glass as described above, the tensile stress among the bending stress becomes dominant in the inner crack region, in particular, when the inner crack region is formed on a large-diameter side (outer periphery side in the thickness direction) under a state in which the tube glass is bent. Thus, the cracks are allowed to propagate in the circumferential direction more effectively. Further, in this case, when the tensile force is applied to the tube glass along the longitudinal direction together with the bending force, the tensile force acts in directions, in which one tube glass and the other tube glass opposed to each other with the cracks interposed therebetween are separated from each other, when the cracks reach a radially inner side of the tube glass. Thus, the interference between the tube glasses on the radially inner side in a curved state can be avoided to the extent possible to stably provide the cut surface with satisfactory properties.

Further, with the method of cutting a tube glass according to the present invention, a portion of the tube glass in which the inner crack region is formed may be subjected to local heating and cooling, to thereby generate the stress that urges the one or more cracks to propagate in the circumferential direction of the tube glass.

According to the above-mentioned method, a desired stress distribution can be generated with more satisfactory precision as compared to the case in which an external force (for example, a tensile force and a bending force) is applied, by accurately controlling a heating region and a cooling region, and a heating temperature and a cooling temperature, respectively. Thus, the higher-quality cut surface can be obtained.

Further, the first technical object is achieved by a cutting device for a tube glass according to the present invention. That is, the cutting device for a tube glass comprises: an inner crack region forming device configured to irradiate the tube glass with laser light having a focal point adjusted to an inside of the tube glass, thereby being capable of forming an inner crack region including one or more one or more cracks in a portion of the tube glass in a circumferential direction of the tube glass through multiphoton absorption that occurs in an irradiation region of the laser light; and a crack propagation device configured to generate, in the tube glass, a stress that urges the one or more cracks in the inner crack region to propagate in the circumferential direction of the tube glass, to thereby cause the one or more cracks to propagate throughout an entire circumference of the tube glass.

As described above, with the cutting device for a tube glass according to the present invention, the cracks (inner crack region) can be formed in the tube glass instead of being formed on the surface thereof in the same manner as in the method of cutting a tube glass. Therefore, the situation in which glass powder similar to scratches is generated can be avoided during formation of the cracks. Therefore, the time and labor for removing the glass powder by cleaning can be omitted to reduce the number of required processes. Further, in the present invention, the stress that urges the cracks in the inner crack region to propagate in the circumferential direction of the tube glass is generated in the tube glass, to thereby cause the cracks to propagate throughout the entire circumference of the tube glass. Therefore, the entire region of the cut surface can be formed of fracture surfaces of the cracks in the inner crack region formed through multiphoton absorption of the laser light and the fracture surfaces of the cracks that propagate from the inner crack region. When the cut surface is formed as described above, as compared to the case in which the cracks are forcibly generated and caused to propagate by cleaving or the like, the occurrence of cracking, chipping, and the like can be prevented to the extent possible to control the properties of the cut surface with relatively high precision, with the result that the cut surface with satisfactory properties can be obtained stably. Further, as described above, when the inner crack region is formed in the portion of the tube glass in the circumferential direction thereof with the laser light, and the cracks in the inner crack region are caused to propagate in the circumferential direction of the tube glass, the time period required for cutting becomes shorter as compared to the case in which the inner crack region is formed throughout the entire circumference by irradiation with laser light. Accordingly, the tube glass can be cut at a high speed, and the cutting method according to the present invention can be easily introduced into, for example, a manufacturing line.

Further, the second technical object is achieved by a method of manufacturing a tube glass according to the present invention. That is, the method of manufacturing a tube glass comprises cutting a continuous tube glass subjected to tube drawing forming in a cutting step provided during conveyance of the continuous tube glass to provide a tube glass product. The method of manufacturing a tube glass comprises: irradiating the continuous tube glass with laser light having a focal point adjusted to an inside of the tube glass, to thereby form an inner crack region including one or more cracks in a portion of the continuous tube glass in a circumferential direction of the tube glass through multiphoton absorption that occurs in an irradiation region of the laser light; and generating, in the continuous tube glass, a stress that urges the one or more cracks in the inner crack region to propagate in the circumferential direction of the continuous tube glass to cause the one or more cracks to propagate throughout an entire circumference of the continuous tube glass, to thereby cut the continuous tube glass to provide a tube glass product.

As described above, with the method of manufacturing a tube glass according to the present invention, the one or more cracks (inner crack region) can be formed in the continuous tube glass instead of being formed on the surface of the continuous tube glass in the same manner as in the method of cutting a tube glass. Therefore, the situation in which glass powder similar to scratches is generated can be avoided during formation of the cracks. Therefore, the time and labor for removing the glass powder by cleaning can be omitted to reduce the number of required processes. Further, in the present invention, the stress that urges the cracks in the inner crack region to propagate in the circumferential direction of the continuous tube glass is generated in the continuous tube glass, to thereby cause the cracks to propagate throughout the entire circumference of the continuous tube glass. Therefore, the entire region of the cut surface can be formed of fracture surfaces of the cracks in the inner crack region formed through multiphoton absorption of the laser light and fracture surfaces of the cracks that propagate from the inner crack region. When the cut surface is formed as described above, as compared to the case in which cracks are forcibly generated and caused to propagate by cleaving or the like, the occurrence of cracking, chipping, and the like can be prevented to the extent possible to control the properties of the cut surface with relatively high precision, with the result that the cut surface with satisfactory properties can be obtained stably. Further, as described above, when the inner crack region is formed in the portion of the continuous tube glass in the circumferential direction thereof with the laser light, and the cracks in the inner crack region are caused to propagate in the circumferential direction of the continuous tube glass, the time period required for cutting becomes shorter as compared to the case in which the inner crack region is formed throughout the entire circumference by irradiation with laser light. Accordingly, the continuous tube glass can be cut at a high speed, and the manufacturing speed can be increased.

Advantageous Effects of Invention

As described above, with the method of cutting a tube glass and the cutting device for a tube glass according to the present invention, the cut surface with satisfactory quality can be obtained, and the generation of glass powder can be prevented, in spite of the fact that the tube glass is cut at a high speed. Thus, the back-end steps with respect to the tube glass after being cut can be reduced to increase productivity.

Further, as described above, with the method of manufacturing a tube glass product according to the present invention, the cut surface with satisfactory quality can be obtained, and the generation of glass powder can be prevented, in spite of the fact that the tube glass is cut at a high speed. Thus, the back-end steps with respect to the tube glass after being cut can be reduced to increase productivity.

DESCRIPTION OF EMBODIMENTS

Now, a first embodiment of the present invention is described with reference to FIG. 1 to FIG. 9. In the first embodiment, as an example, description is given below of the case in which a continuous tube glass is used as a tube glass to be cut, and the continuous tube glass is cut while being conveyed, to thereby provide a tube glass product having a predetermined length.

Figure 1:
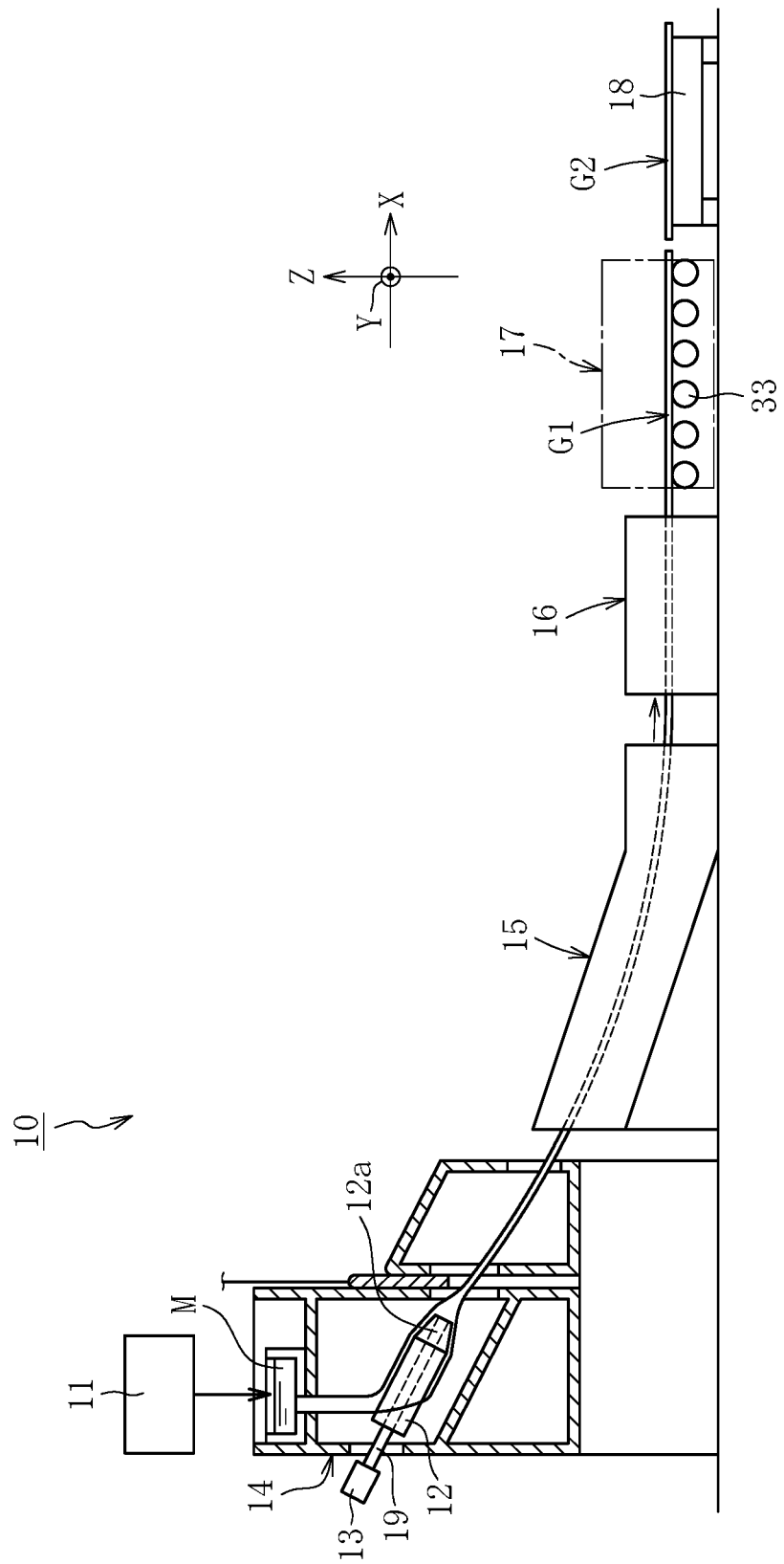
FIG. 1 is a side view of a manufacturing apparatus for a tube glass product of a first embodiment of the present invention.

FIG. 1 is a view for illustrating an overall configuration of a manufacturing apparatus 10 for a tube glass product of the first embodiment of the present invention. The manufacturing apparatus 10 for a tube glass product illustrated in FIG. 1 is configured to form a continuous tube glass G1 by a Danner method, and mainly comprises a glass melting furnace 11, a sleeve 12, a drive device 13 configured to drive the sleeve 12 to rotate, a muffle furnace 14 configured to accommodate the sleeve 12, an annealer 15, a tube drawing device 16 configured to subject the continuous tube glass G1 to tube drawing forming, a cutting device 17 configured to cut the continuous tube glass G1, and a conveyer 18 configured to convey a tube glass product G2 obtained by cutting the continuous tube glass G1. The configuration up to a stage in which the continuous tube glass G1 reaches the cutting device 17 is first described below.

Figure 3:
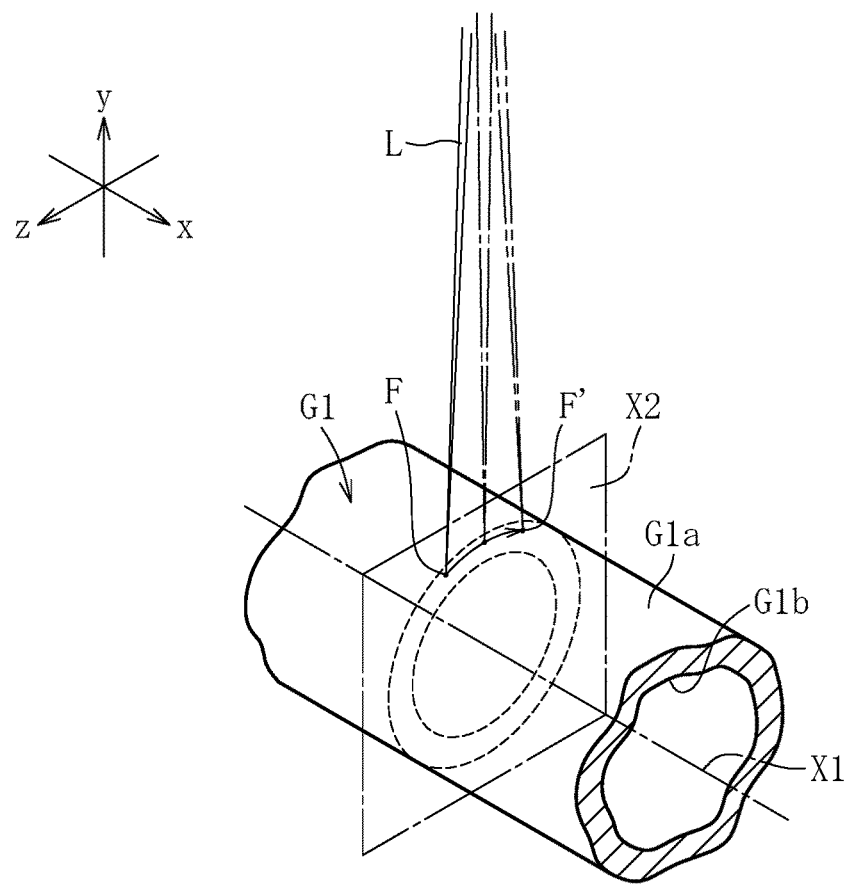
FIG. 3 is an enlarged perspective view of a main portion of a continuous tube glass for illustrating an irradiation mode of laser light.

A XYZ coordinate system illustrated in FIG. 1 is a coordinate system on a fixed side. In the first embodiment, a plane comprising an X-axis and a Y-axis is defined as a horizontal plane, and a direction along a Z-axis is defined as a vertical direction (the positive side of the Z-axis is defined as a top, and the negative side thereof is defined as a bottom). Further, a xyz coordinate system illustrated in FIG. 3 is a coordinate system on a moving side (coordinate system on the continuous tube glass G1). In the same manner as in the XYZ system illustrated in, for example, FIG. 1, a plane comprising an x-axis and a y-axis is defined as a horizontal plane, and a direction along a z-axis is defined as a vertical direction.

The glass melting furnace 11 is configured to melt a glass raw material to generate a molten glass M. The molten glass M generated in the glass melting furnace 11 is supplied to the sleeve 12 in the muffle furnace 14.

The sleeve 12 is formed into a cylindrical shape through use of a refractory. In the first embodiment, the sleeve 12 is partially tapered, and is arranged so that a small-diameter-side end portion 12a of a tapered portion is directed obliquely downwardly. The sleeve 12 is connected to the drive device 13 through intermediation of a shaft 19. When the sleeve 12 is driven to rotate by the drive device 13, the molten glass M supplied to the sleeve 12 can be wound into a cylindrical shape and be pultruded into a tube shape from the small-diameter-side end portion 12a.

As described above, the molten glass M pultruded into a tube shape is continuously pulled out of the muffle furnace 14 as the continuous tube glass G1 and guided into the annealer 15.

The tube drawing device 16 is arranged on a downstream side of the annealer 15 and is configured to pull the continuous tube glass G1 having passed through the annealer 15 at a constant speed so that the continuous tube glass G1 can be conveyed to the cutting device 17. Specifically, the continuous tube glass G1 aligned to a predetermined outer diameter can be supplied to the cutting device 17 by pulling the continuous tube glass G1 in a downstream direction while sandwiching an upper portion and a lower portion of the continuous tube glass G1 between a pair of conveyance belts (not shown), to thereby subject the continuous tube glass G1 to tube drawing.

Next, the detail of the cutting device 17 is described with reference to, for example, FIG. 2.

Figure 2:
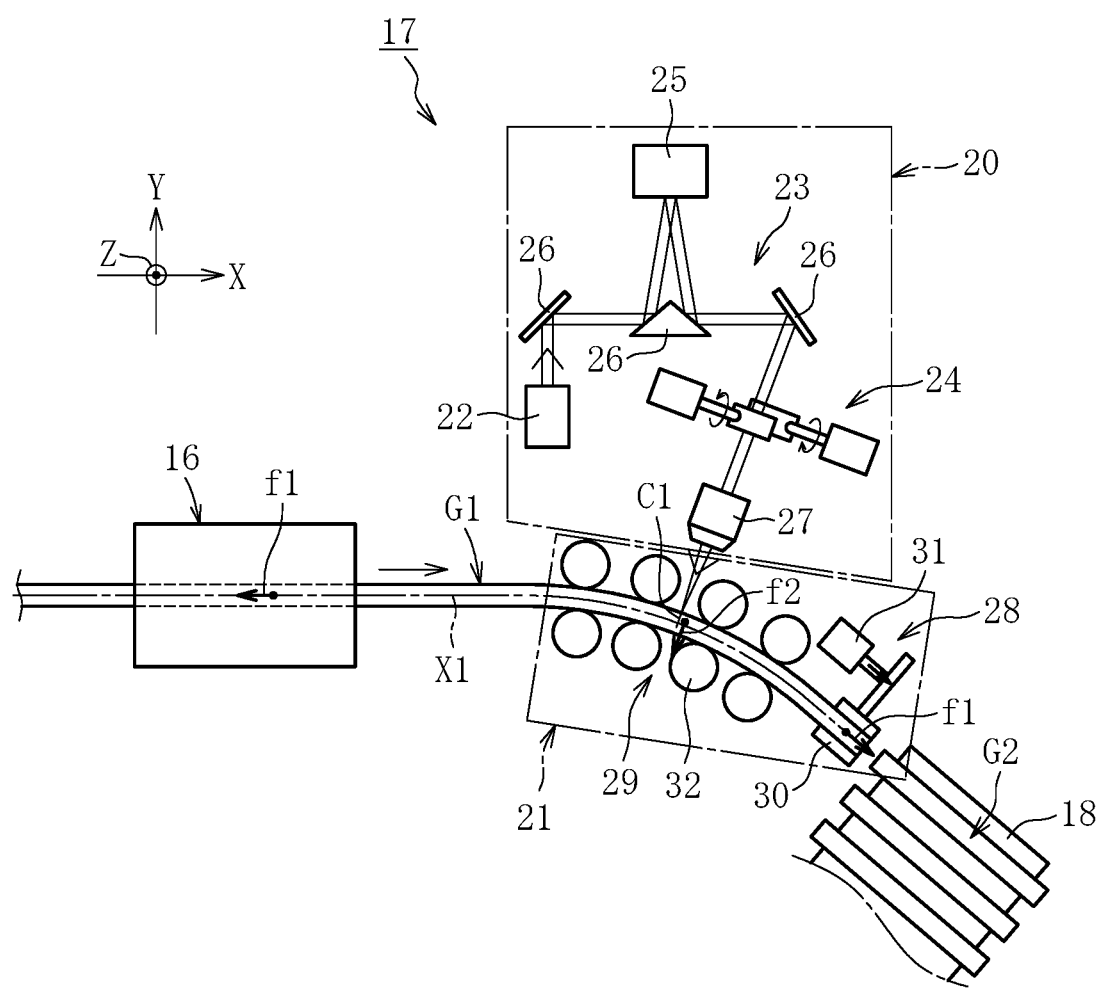
FIG. 2 is a plan view of a main portion of the manufacturing apparatus illustrated in FIG. 1.

As illustrated in FIG. 2, the cutting device 17 is configured to cut the continuous tube glass G1 to obtain the tube glass product G2 having a predetermined length. The cutting device 17 comprises an inner crack region forming device 20 configured to form an inner crack region C1 in a portion of the continuous tube glass G1 in a circumferential direction thereof and a crack propagation device 21 configured to generate, in the continuous tube glass G1, a stress that urges cracks in the inner crack region C1 to propagate, to thereby cause the cracks to propagate throughout an entire circumference.

The inner crack region forming device 20 comprises a laser oscillator 22 capable of oscillating predetermined laser light (for example, a pulse laser) L and an optical system 23 configured to cause the laser light L oscillated from the laser oscillator 22 to be condensed and enter an inside of the continuous tube glass G1. In addition, in the first embodiment, the inner crack region forming device 20 further comprises a scanning portion 24 that is arranged on a path of the optical system 23 and configured to cause the laser light L to perform scanning in a predetermined mode as illustrated in FIG. 3 and a focal point adjusting portion 25 capable of adjusting a position of a focal point F of the laser light L in the continuous tube glass G1 similarly as illustrated in FIG. 3.

In the first embodiment, the optical system 23 comprises a plurality of mirrors 26 and an objective lens 27 configured to condense the laser light L transmitted through the plurality of mirrors 26 into the continuous tube glass G1.

Figure 4:
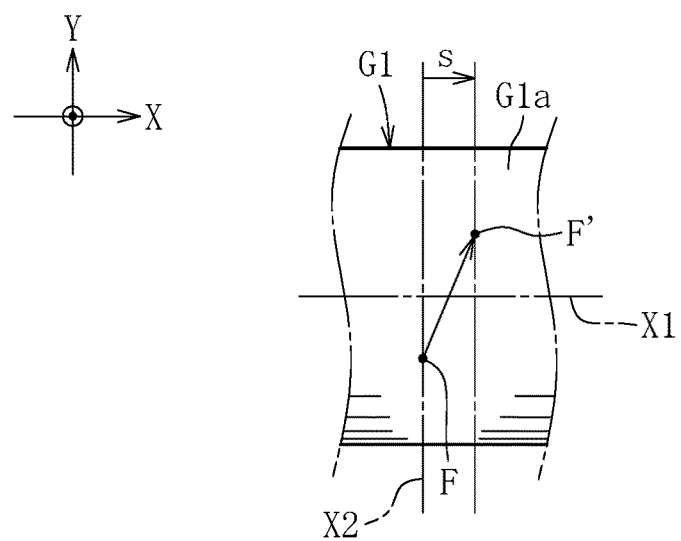
FIG. 4 is an enlarged plan view of a main portion of the continuous tube glass for illustrating the irradiation mode of laser light.
Figure 5:
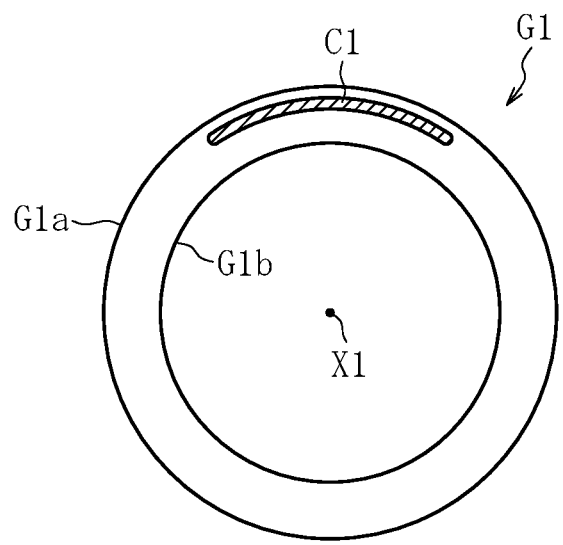
FIG. 5 is a sectional view of a main portion of the continuous tube glass immediately after an inner crack region is formed.
Figure 6:
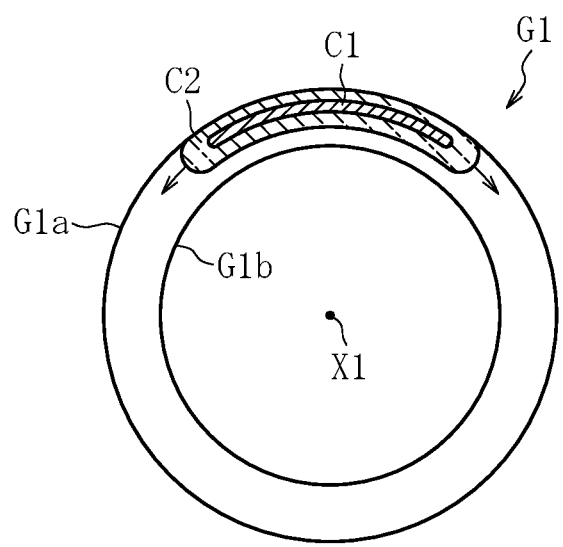
FIG. 6 is a sectional view of a main portion of the continuous tube glass immediately after cracks in the inner crack region start propagating in a circumferential direction of the continuous tube glass.

The scanning portion 24 is formed of a Galvano mirror, for example, as illustrated in FIG. 2. The scanning portion 24 is constructed so as to cause the laser light L reflected from the mirrors 26 to perform scanning in a predetermined locus. For example, in the first embodiment, as illustrated in FIG. 3, the scanning portion 24 is constructed so as to cause the laser light L to perform scanning linearly along the circumferential direction of the continuous tube glass G1 in such a manner that the focal point F is included in an imaginary cross section X2 orthogonal to a center line X1 of the continuous tube glass G1. The scanning locus described above has a form in the case of being viewed in the coordinate system (xyz coordinate system illustrated in FIG. 3) based on the moving continuous tube glass G1. When the scanning locus is viewed in the coordinate system based on the fixed side, as illustrated in FIG. 4, the scanning form of the focal point F is set in the following manner. While the continuous tube glass G1 moves by a predetermined distance s in a direction along the center line X1, the focal point F moves by a distance from the focal point F to a focal point F' in a direction (Z-direction of FIG. 3) along the circumferential direction and moves by the same distance as the moving distance (predetermined distance s) of the continuous tube glass G1 in the direction along the center line X1.

The focal point adjusting portion 25 comprises, for example, a spatial phase modulator. In this case, specifically, a spatial phase distribution of the laser light L is set to be able to be modulated so that the position of the focal point F (more exactly, the position of the continuous tube glass G1 in a thickness direction thereof) is adjusted with a phase hologram produced in advance in accordance with the irradiation direction of the laser light L controlled by the scanning portion 24. In the first embodiment, as illustrated in FIG. 3, the position of the focal point F of the laser light L is adjusted so that the focal point F is positioned along the circumferential direction of the continuous tube glass G1 on an outer periphery side (side close to an outer peripheral surface G1a) of the continuous tube glass G1 in the thickness direction thereof.

In the first embodiment, as illustrated in FIG. 2, the crack propagation device 21 comprises a tensile force applying portion 28 configured to apply a tensile force f1 in the direction along the center line X1 of the continuous tube glass G1 and a bending force applying portion 29 configured to apply a bending force f2 to the continuous tube glass G1 so that the center line X1 of the continuous tube glass G1 is curved at a predetermined curvature.

In this case, for example, the tensile force applying portion 28 comprises a gripping portion 30 configured to grip a downstream-side end portion of the continuous tube glass G1 and a slide drive portion 31 configured to move the gripping portion 30 in the direction along the center line X1. The slide drive portion 31 may be constructed so as to move the gripping portion 30 in synchronization with the continuous tube glass G1. In this case, the state in which the tensile force f1 is applied to the continuous tube glass G1 that is being moved along the center line X1 can be maintained for a predetermined time period (predetermined distance).

Further, the bending force applying portion 29 comprises a plurality of rollers 32 configured to hold both sides of the continuous tube glass G1 in a horizontal direction thereof. The positions of the continuous tube glass G1 supported (held) by the plurality of rollers 32 are set so that the center line X1 of the continuous tube glass G1 is curved at a predetermined curvature as the center line X1 is directed to the downstream side.

Next, an example of a method of cutting the continuous tube glass G1 through use of the cutting device 17 having the above-mentioned configuration is mainly described with reference to FIG. 2 to FIG. 9.

First, as illustrated in FIG. 2, the continuous tube glass G1 sent from the tube drawing device 16 is conveyed further to the downstream side while being supported by support portions 33 (see FIG. 1) from below. In this case, the cutting device 17 configured to cut the continuous tube glass G1 to a predetermined length is arranged on a downstream side of the tube drawing device 16. When the downstream-side end portion of the continuous tube glass G1 reaches a predetermined position (or a position immediately before the predetermined position), the downstream-side end portion of the continuous tube glass G1 is gripped with the gripping portion 30, and the gripping portion 30 is moved by the slide drive portion 31 toward the downstream side in a longitudinal direction. Then, the tensile force f1 in the direction along the center line X1 is applied to the continuous tube glass G1. Further, the plurality of rollers 32 forming the bending force applying portion 29 are arranged on an upstream side of the gripping portion 30, and the predetermined bending force f2 is applied to the continuous tube glass G1 having passed between the plurality of rollers 32 so that the center line X1 is curved at a predetermined curvature. In the first embodiment, the continuous tube glass G1 is curved at a predetermined curvature so that the irradiation side (upper right side of FIG. 2) of the laser light L described later becomes convex. With this, in the above-mentioned state, the tensile stress in directions separated from each other along the center line X1 is generated throughout the entire circumference of the continuous tube glass G1. In particular, on a large-diameter side of the curved portion of the continuous tube glass G1, the tensile stress in the directions separated from each other along the center line X1 is dominantly distributed.

Then, the inside of the continuous tube glass G1 is irradiated with the laser light L under a state in which the above-mentioned stress distribution is maintained. In this case, the inner crack region C1 including one or a plurality of cracks is formed through multiphoton absorption of the laser light L in the region irradiated with the laser light L by adjusting the irradiation condition (for example, a pulse width and an output) of the laser light L. Further, in this case, the laser light L is caused to perform scanning in a predetermined locus (for example, a region from the focal point F to the focal point F' of FIG. 3) with the scanning portion 24, and the position of the focal point F of the laser light L is changed with the passage of time with the focal point adjusting portion 25. With this, the focal point F is moved along the circumferential direction at a predetermined position of the continuous tube glass G1 in the thickness direction thereof, to thereby form the inner crack region C1 having a predetermined circumferential dimension (see FIG. 5). In the example illustrated in FIG. 5, the inner crack region C1 having a band shape is formed around the center line X1 within a range of 45° or more and less than 90°.

The cracks in the inner crack region C1 are caused to propagate in the circumferential direction to cut the continuous tube glass G1. In the first embodiment, the predetermined stress is generated in the continuous tube glass G1 at a time of irradiation with the laser light L. Therefore, when the inner crack region C1 is formed as described above, the cracks naturally propagate in directions separated from each other along the circumferential direction from both circumferential end portions of the inner crack region C1, and a crack propagation region C2 is enlarged along the circumferential direction (see FIG. 6).

Figure 7:
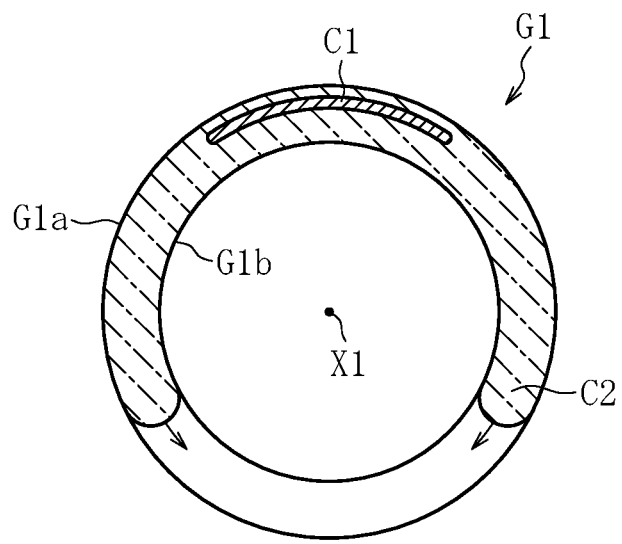
FIG. 7 is a sectional view of a main portion of the continuous tube glass for illustrating a state in which the cracks in the inner crack region are in the process of propagating in the circumferential direction of the continuous tube glass.
Figure 8:
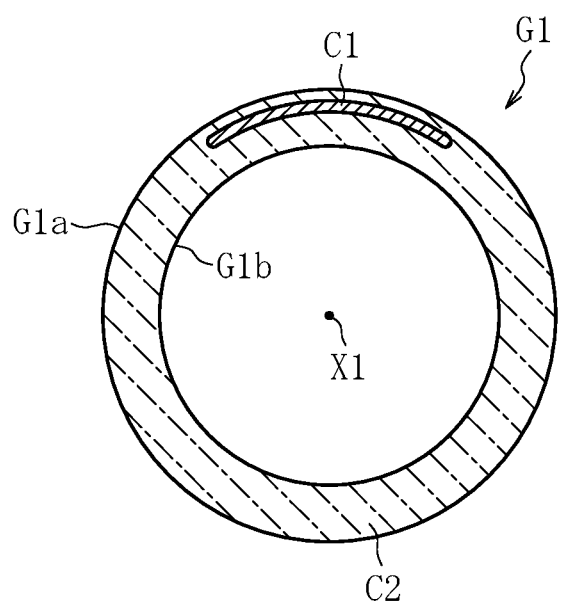
FIG. 8 is a front view of an end surface of the continuous tube glass, for illustrating a state after the cracks in the inner crack region propagate throughout an entire circumference of the continuous tube glass.
Figure 9:
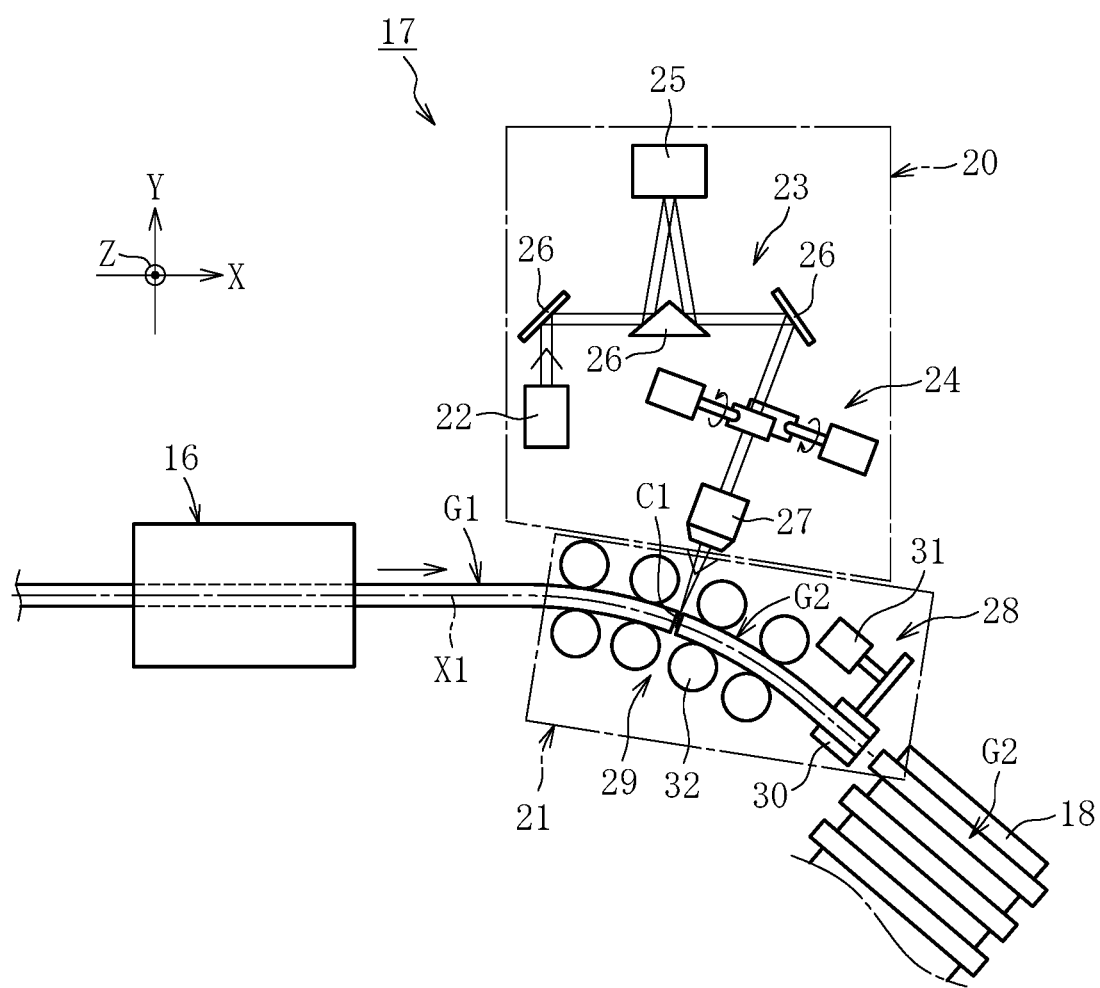
FIG. 9 is a plan view of a main portion of the manufacturing apparatus illustrated in FIG. 1 for illustrating a state immediately after the continuous tube glass is cut.

In this case, when the above-mentioned stress is applied to the continuous tube glass G1 with the crack propagation device 21 (tensile force applying portion 28 and bending force applying portion 29), the crack propagation region C2 starts being enlarged in the directions separated from each other from both the circumferential sides of the inner crack region C1 (FIG. 6), and after that, also continues to be enlarged at the same speed along the circumferential direction (see FIG. 7). As described above, the cracks continue to propagate (the crack propagation region C2 is enlarged) in a so-called symmetric manner, with the result that the right and left crack propagation regions C2 simultaneously reach a predetermined circumferential position (for example, a position directly facing a circumferential center position of the inner crack region C1 with the center line X1 interposed therebetween in FIG. 8). As a result, the cracks in the inner crack region C1 propagate throughout the entire circumference to cut the continuous tube glass G1. Further, through this cutting, the tube glass product G2 having a predetermined length is obtained (see FIG. 9).

As described above, with the method of manufacturing the tube glass product G2 and the manufacturing apparatus 10 for the tube glass product G2 (the method of cutting the continuous tube glass G1 and the cutting device 17) according to the present invention, the cracks (inner crack region C1) can be formed in the continuous tube glass G1 instead of being formed on the surface thereof, and hence the situation in which glass powder similar to scratches is generated can be avoided during formation of the cracks (cracks in the inner crack region C1). Therefore, the time and labor for removing the glass powder by cleaning can be omitted to reduce the number of required processes. Further, when the stress that urges the cracks in the inner crack region C1 to propagate in the circumferential direction of the continuous tube glass G1 is generated in the continuous tube glass G1, to thereby cause the cracks to propagate throughout the entire circumference of the continuous tube glass G1, the entire region of the cut surface generated in the continuous tube glass G1 or the tube glass product G2 can be formed of fracture surfaces of the cracks in the inner crack region C1 formed through multiphoton absorption of the laser light L and fracture surfaces of the cracks that propagate from the inner crack region C1. With this, the occurrence of cracking and chipping in the cut surface can be prevented to the extent possible to stably control the properties of the cut surface, with the result that the cut surface with satisfactory properties can be obtained. Further, as described above, when the inner crack region C1 is formed in the portion of the continuous tube glass G1 in the circumferential direction thereof with the laser light L, and the cracks in the inner crack region C1 are caused to propagate in the circumferential direction of the continuous tube glass G1, a time period required for cutting becomes shorter as compared to the case in which the inner crack region C1 is formed throughout the entire circumference by irradiation with laser light L. Accordingly, the continuous tube glass G1 can be cut at a high speed, and the manufacturing speed can be increased.

Further, in the first embodiment, the continuous tube glass G1 is irradiated with the laser light L having the focal point F adjusted to the inside of the continuous tube glass G1 under a state in which the stress that urges the cracks in the inner crack region C1 to propagate in the circumferential direction of the continuous tube glass G1 is generated in the continuous tube glass G1, to thereby form the inner crack region C1 in the portion of the continuous tube glass G1 in the circumferential direction thereof. With this method, a stress distribution state that occurs in the continuous tube glass G1 can be more accurately reproduced as compared to, for example, the case in which the above-mentioned stress is generated immediately after the formation of the inner crack region C1. Further, the state in which the stress is generated is maintained more easily when the stress is generated in the continuous tube glass G1 by applying an external force (tensile force f1 and bending force f2) to the continuous tube glass G1 in advance. Thus, the cracks are caused to propagate accurately along a desired direction, thereby being capable of stably providing the cut surface with satisfactory quality (surface properties), which is formed in the inner crack region C1 and the crack propagation region C2.

One embodiment (first embodiment) of the method of manufacturing a continuous tube glass and the manufacturing apparatus 10 for a continuous tube glass according to the present invention are described above. However, needless to say, the manufacturing method and the manufacturing apparatus 10 may adopt any mode within the scope of the present invention.

Figure 10:
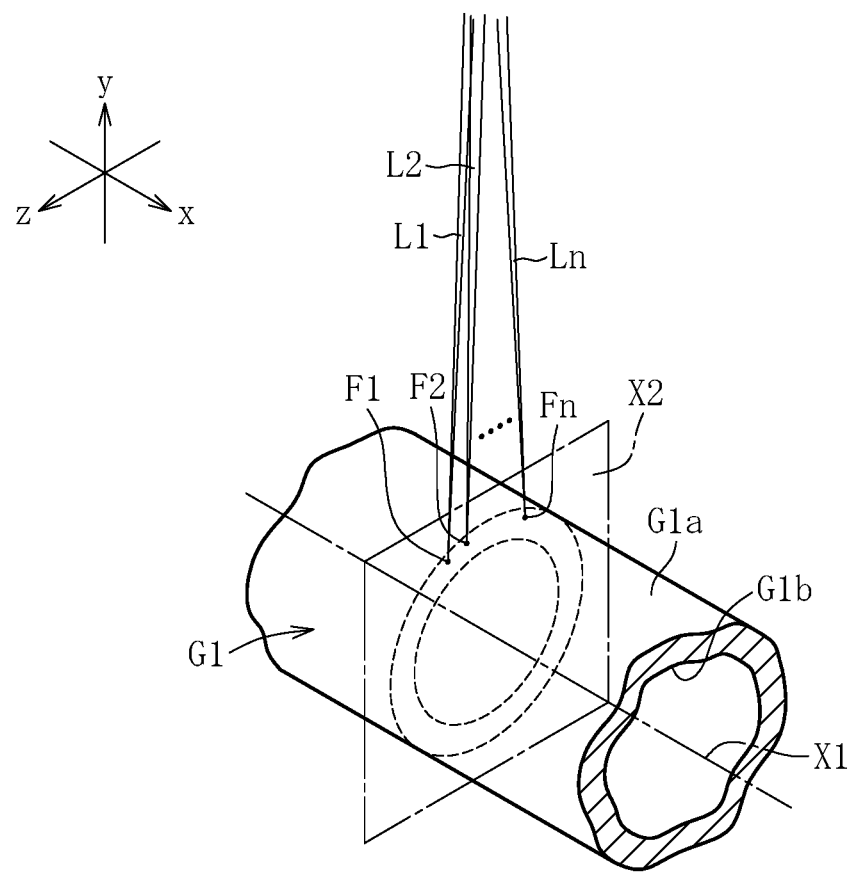
FIG. 10 is a perspective view of a main portion of a tube glass for illustrating a method of cutting a tube glass according to a second embodiment of the present invention.

In the above-mentioned embodiment, for example, the case is illustrated in which the scanning portion 24 is arranged in the inner crack region forming device 20, and the continuous tube glass G1 is irradiated with the laser light L while the laser light L performs scanning in a predetermined locus. However, needless to say, other irradiation modes may also be adopted. FIG. 10 is a view for illustrating an irradiation mode of the laser light L according to one example of the other irradiation modes (second embodiment of the present invention). In a cutting method according to the second embodiment, as illustrated in FIG. 10, the inner crack region C1 having a predetermined size is formed by simultaneously irradiating the continuous tube glass G1 with a plurality of laser lights L1, L2, . . . Ln instead of causing the laser light L to perform scanning in a predetermined locus with the scanning portion 24.

Figure 11:
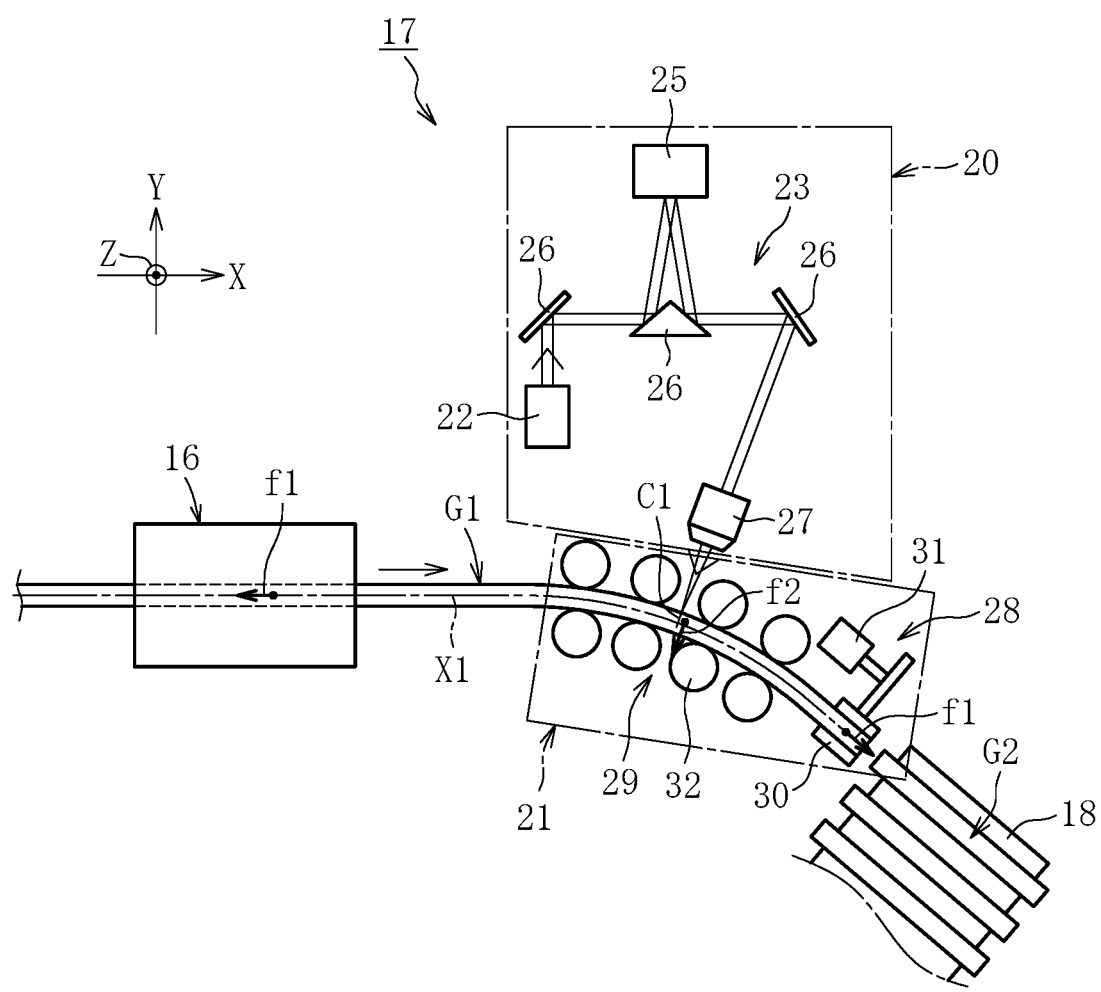
FIG. 11 is a plan view of a main portion of a manufacturing apparatus for a tube glass product according to the second embodiment of the present invention.

In this case, as illustrated in FIG. 11, the scanning portion 24 is not required and hence can be omitted. Further, when the focal point adjusting portion 25 is formed of a spatial phase modulator, through change in setting of a phase hologram, the positions of focal points F1, F2, . . . Fn of the laser lights L1, L2, . . . Ln can be adjusted individually and independently, and one laser light L can also be dispersed into a desired number of laser lights. Thus, even when one laser oscillator 22 is used as illustrated in FIG. 11, predetermined inner positions of the continuous tube glass G1 can be simultaneously irradiated with a desired number of the laser lights L1, L2, . . . Ln having the focal points F1, F2, . . . Fn adjusted to the predetermined inner positions. When a plurality of points are simultaneously irradiated with the dispersed laser light L as described above, the inner crack region C1 of the continuous tube glass G1 can be formed through one or a significantly small number of (at most several times) of irradiations, and hence the continuous tube glass G1 can be cut within a significantly short time period. Thus, the cutting device 17 according to the present invention can be relatively easily introduced into a manufacturing line.

Needless to say, when the scanning portion 24 and the focal point adjusting portion 25 are used together, scanning can be performed at a high speed. Therefore, the number of irradiations of the laser light L can be increased, for example, through a scanning mode in which the laser light L reciprocates between the focal points F and F' illustrated in FIG. 3 a plurality of times (including the range of from several times to hundreds of times). As the number of irradiations is larger, the irradiation energy per irradiation can be decreased, and hence the inner crack region C1 having a smaller variation in shape precision can be formed correspondingly. Needless to say, even when a plurality of points (focal points F1, F2, . . . Fn) are irradiated with the laser lights L1, L2, . . . Ln as described above, the inner crack region C1 may be formed by a plurality of times of irradiations. As the laser light L that can be used in the case of forming the inner crack region C1 by one multiple-point irradiation as described above, there may be given a subnanosecond pulse laser having relatively large irradiation energy, and as the laser light L that can be used in the case of forming the inner crack region C1 through scanning involving a plurality of times of reciprocations, there may be given a picosecond pulse laser having relatively small irradiation energy.

Now, a third embodiment of the present invention is described with reference to FIG. 12 to FIG. 17.

Figure 12:
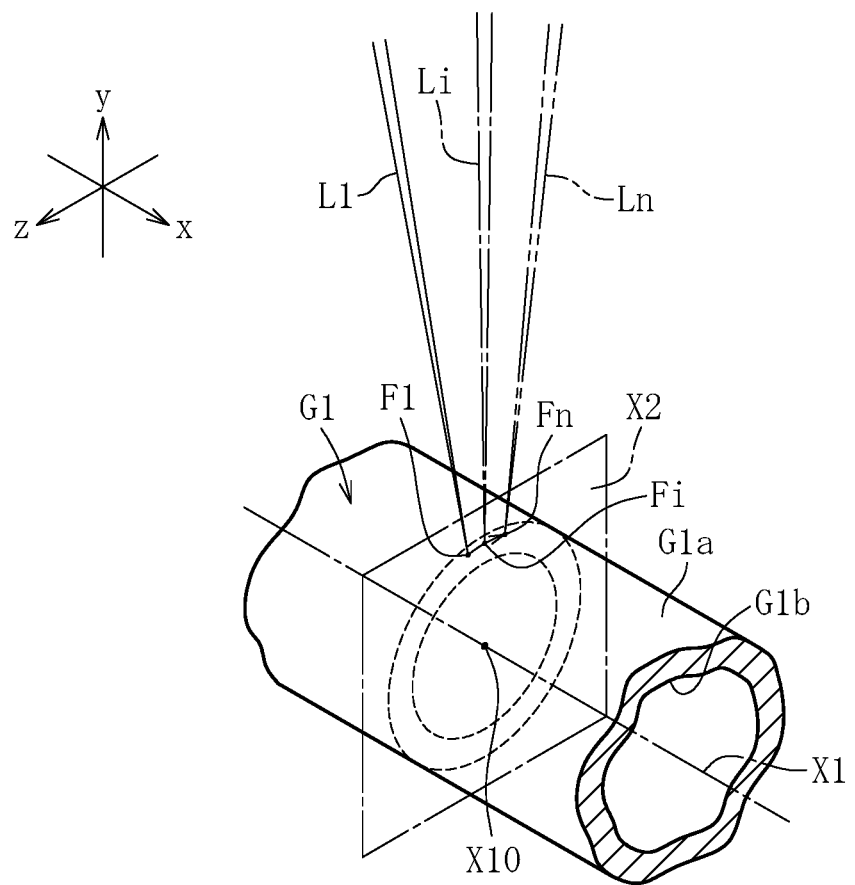
FIG. 12 is a perspective view of a main portion of a tube glass for illustrating a method of cutting a tube glass according to a third embodiment of the present invention.

FIG. 12 is a perspective view of a main portion of the continuous tube glass G1 for illustrating a method of cutting a tube glass according to the third embodiment of the present invention. In the third embodiment, laser light Li (i=1, 2, ... n) is irradiated toward a point at which the center line X1 of the continuous tube glass G1 and the imaginary cross section X2 cross each other, that is, a center point X10 of the continuous tube glass G1 on the imaginary cross section X2, and with this, the inner crack region C1 is formed in a portion of the continuous tube glass G1 in the circumferential direction thereof at a position that is significantly close to the outer peripheral surface G1a. The laser light Li used in this case is a pulse laser, and the laser light Li is caused to perform scanning, for example, so that the position of a focal point Fi (i=1, 2, ... h) of the laser light Li draws a locus (arc shape with the center point X10 being the center in this case) illustrated in FIG. 12 through use of the scanning portion 24 and the focal point adjusting portion 25 illustrated in FIG. 2. When the laser light Li serving as a pulse laser is caused to perform scanning, a region between the focal point F1 and the focal point Fn is intermittently irradiated with the laser light Li, with the result that a plurality of holes H and a primary crack propagation region C21 described later, which are generated through abrasion, can be formed.

Figure 13:
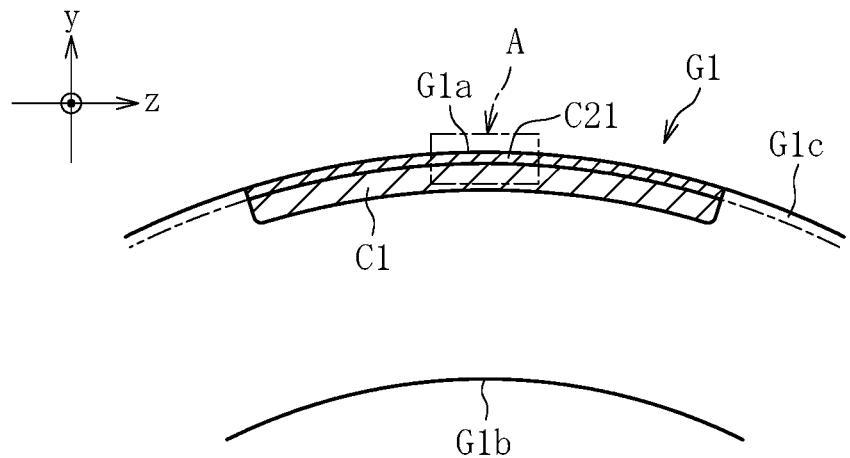
FIG. 13 is a sectional view of a main portion of a continuous tube glass immediately after an inner crack region is formed in an irradiation mode illustrated in FIG. 12.

In this case, as illustrated in FIG. 13 in an enlarged state, the inner crack region C1 is formed in the vicinity of the outer peripheral surface G1a while a surface layer portion G1c including the outer peripheral surface G1a of the continuous tube glass G1 is left. Further, in a portion of the surface layer portion G1c in the circumferential direction thereof, which is to be a region between the inner crack region C1 and the outer peripheral surface G1a, the primary crack propagation region C21 formed by propagation of the cracks in the inner crack region C1 to the outer peripheral surface G1a of the continuous tube glass G1 is formed.

Figure 14:
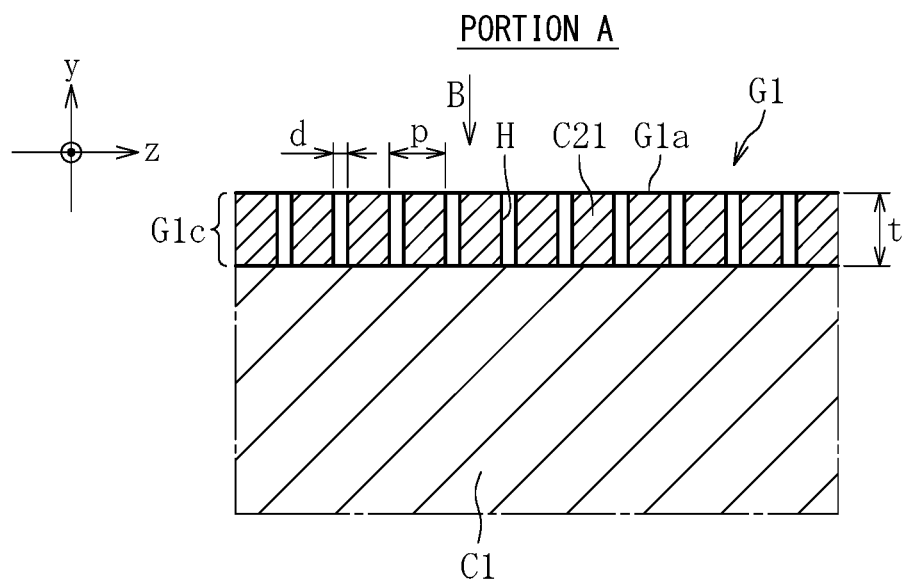
FIG. 14 is an enlarged view of a portion A of FIG. 13.
Figure 15:
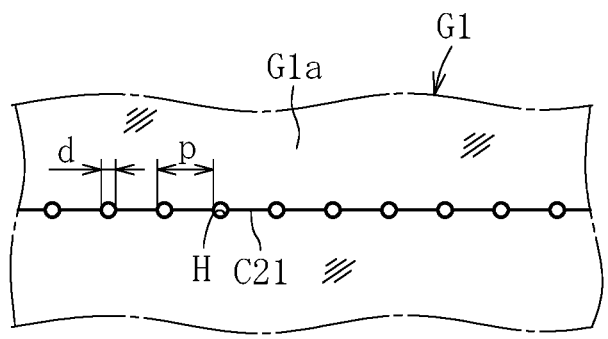
FIG. 15 is an enlarged view of a main portion of the continuous tube glass illustrated in FIG. 14 when viewed from a direction of the arrow B.

As illustrated in FIG. 14 in which a portion A of FIG. 13 is further enlarged, the plurality of holes H (Hi: i=1, 2, ... n) opened to the outer peripheral surface G1a of the continuous tube glass G1 are formed in the surface layer portion G1c so as to be adjacent to each other in the circumferential direction. The plurality of holes H are formed by generating abrasion in the surface layer portion G1c by irradiation with the pulse laser (laser light Li) directed to the center point X10 of the continuous tube glass G1 and extend in the irradiation direction of the laser light L, that is, in the thickness direction of the tube glass G1. The primary crack propagation region C21 is formed between the plurality of holes H adjacent to each other in the circumferential direction. In the third embodiment, the plurality of holes H and the primary crack propagation region C21 are formed throughout the entire region of the surface layer portion G1c in the thickness direction thereof. In this case, as illustrated in FIG. 15, the primary crack propagation region C21 connects the plurality of holes H to each other with the shortest distance (that is, linearly) and is formed on the outer peripheral surface G1a of the continuous tube glass G1.

Here, it is appropriate that a thickness t of the surface layer portion G1c be set to, for example, 20 μm or less, preferably 10 μm or less. When the thickness t is set to 20 μm or less, it is possible to expect the action in which the cracks in the inner crack region C1 propagate to the outer peripheral surface G1a smoothly and accurately.

Further, it is appropriate that a circumferential pitch p of the plurality of holes H be set to, for example, 1.5 times or more and 5.0 times or less, preferably 2.0 times or more and 4.0 times or less, in relation to an inner diameter d of the holes H. When the circumferential pitch p of the plurality of holes H is set within the above-mentioned range at a magnification with respect to the inner diameter d of each of the holes H, it is possible to expect the action in which the cracks propagate smoothly and accurately so as to connect the plurality of holes H adjacent to each other in the circumferential direction (see FIG. 15).

Next, an example of a forming mode of the primary crack propagation region C21 is described with reference to FIG. 16A to FIG. 16C.

Figure 16A:
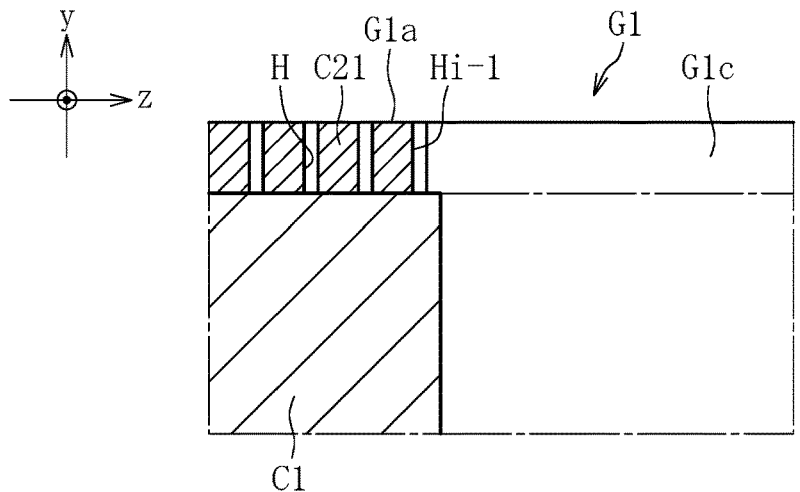
FIG. 16A is an enlarged view of the portion A for illustrating a process in which cracks in an inner crack region propagate to an outer peripheral surface of the continuous tube glass.

First, the following case is considered in which holes Hi-1 are formed in the surface layer portion G1c and the inner crack region C1 is formed up to a region immediately below the surface layer portion G1c, for example, as illustrated in FIG. 16A, when the inside of the continuous tube glass G1 is intermittently irradiated with the laser light Li serving as the pulse laser while the laser light Li is caused to perform scanning in a predetermined direction as described above. In this case, a new inner crack region C1i is formed (see FIG. 16B) with the laser light Li subsequently irradiated toward the continuous tube glass G1 through multiphoton absorption of the laser light Li in a portion adjacent to the inner crack region C1 (FIG. 16A) that has been formed immediately below the surface layer portion G1c. Further, in this case, abrasion of the laser light Li is generated between the new inner crack region C1i and the outer peripheral surface G1a to form new holes Hi at corresponding positions of the surface layer portion G1c.

Figure 16B:
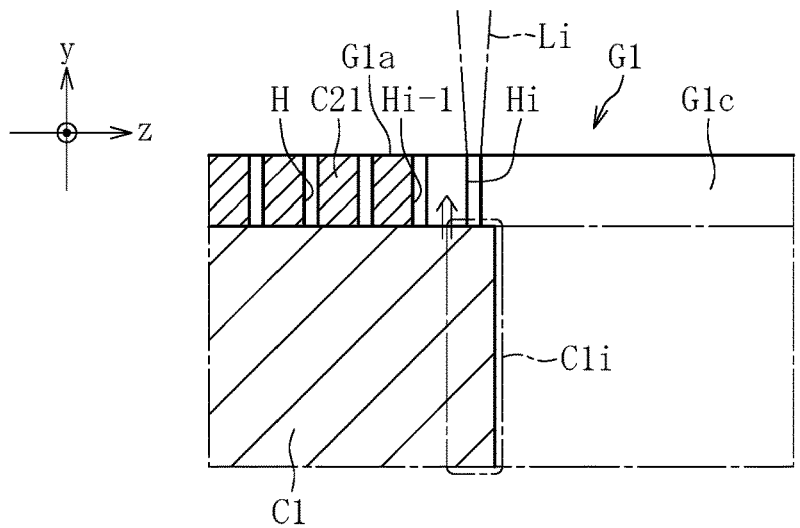
FIG. 16B is an enlarged view of the portion A for illustrating the case in which the cracks in the inner crack region propagate to the outer peripheral surface of the continuous tube glass.
Figure 16C:
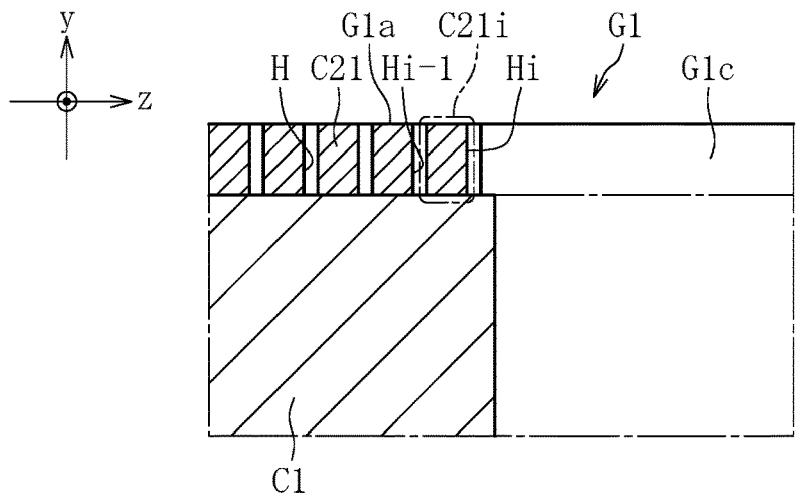
FIG. 16C is an enlarged view of the portion A for illustrating the case in which the cracks in the inner crack region propagate to the outer peripheral surface of the continuous tube glass.

Further, substantially at the same time with the formation of the holes Hi (or after a significantly short time period shorter than the interval of the irradiation time of the laser light Li), the cracks in the newly formed inner crack region C1i propagate to between the holes Hi and Hi-1 in the surface layer portion G1c so as to connect the newly formed hole Hi and the hole Hi-1 adjacent to the hole Hi to each other (FIG. 16B). As a result, a primary crack propagation region C21i is formed between the holes Hi and Hi-1 adjacent to each other in the circumferential direction, and the end portion thereof reaches the outer peripheral surface G1a (see FIG. 16C).

When laser lights Li+1, ... Ln are irradiated intermittently at a predetermined pitch and a predetermined time interval as described above, new inner crack region C1i+1, ... C1n, holes Hi+1, ... Hn, and primary crack propagation regions C21i+1, ... C21n are continuously formed successively, and finally, the inner crack region C1 and the primary crack propagation region C21 illustrated in FIG. 13 are formed.

Figure 17:
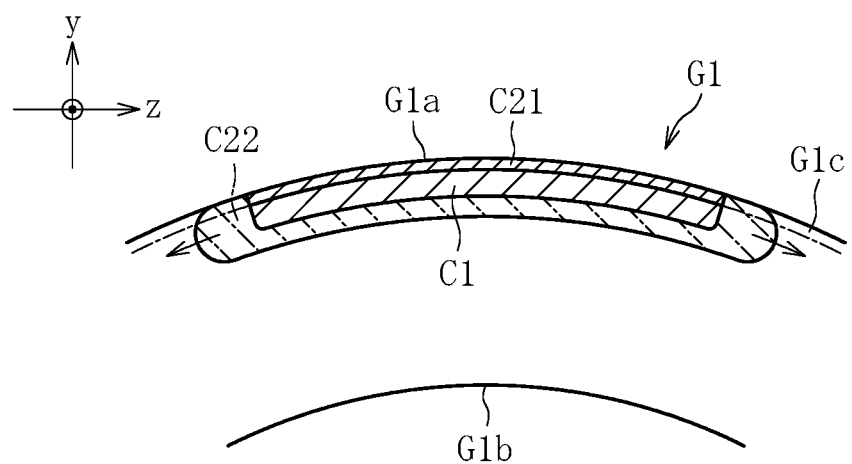
FIG. 17 is a sectional view of a main portion of the continuous tube glass immediately after the cracks in the inner crack region start propagating in a circumferential direction of the continuous tube glass.

Then, as illustrated in FIG. 17, the cracks in the inner crack region C1 or the cracks in the inner crack region C1 and the cracks in the primary crack propagation region C21 are caused to propagate in the circumferential direction. Also in the third embodiment, when a predetermined stress is generated in the continuous tube glass G1 at a time of irradiation with the laser light L1 in the same manner as in the first embodiment, the cracks naturally propagate in the directions separated from each other along the circumferential direction from both the circumferential end portions of the inner crack region C1, and the crack propagation region (secondary crack propagation region C22 in this case) is enlarged along the circumferential direction, by forming the inner crack region C1 and the primary crack propagation region C21 as described above. As a result, the continuous tube glass G1 is cut throughout the entire circumference thereof. Further, through this cutting, the tube glass product G2 having a predetermined length is obtained in the same manner as in, for example, FIG. 9.

As described above, also with the method of cutting a tube glass according to the third embodiment of the present invention, an initial crack (inner crack region C1) can be formed in the continuous tube glass G1, and hence the situation in which glass powder is generated can be avoided. Further, the cut surface with satisfactory properties can be obtained by generating a stress that urges the cracks in the inner crack region C1 to propagate in the circumferential direction of the continuous tube glass G1 to cause the cracks to propagate throughout the entire circumference of the continuous tube glass G1. In particular, when the inner crack region C1 is formed in the vicinity of the outer peripheral surface G1a while the surface layer portion G1c including the outer peripheral surface G1a of the continuous tube glass G1 is left, the cracks in the inner crack region C1 are caused to propagate to the outer peripheral surface G1a (FIG. 16A to FIG. 16C), and the cracks are caused to propagate throughout the entire circumference of the continuous tube glass G1 with the stress that urges the cracks to propagate in the circumferential direction of the continuous tube glass G1 as in the third embodiment, the stress required for cutting the entire circumference of the continuous tube glass G1 can be reduced. Thus, the cut surface with even more satisfactory properties can be obtained.

Further, in the third embodiment, abrasion is generated in the surface layer portion G1c of the continuous tube glass G1 to form the plurality of holes H extending in the irradiation direction of the laser light Li by irradiation with the laser light Li, and the circumferential pitch p between the plurality of holes H is adjusted, to thereby cause the cracks in the inner crack region C1 to propagate to the outer peripheral surface G1a so as to connect the plurality of holes H to each other (FIG. 15). When the plurality of holes H are formed through abrasion of the laser light Li in the surface layer portion G1c of the continuous tube glass G1, and the circumferential pitch p of the plurality of holes H is adjusted to an appropriate size, the primary crack propagation region C21 can be formed stably. Thus, the cracks can be caused to accurately propagate to the outer peripheral surface G1a to provide the cut surface with satisfactory and stable properties.

In the third embodiment, the case is illustrated in which the cracks in the inner crack region C1 are caused to propagate to the outer peripheral surface G1a so as to connect the plurality of holes H to each other by generating abrasion in the surface layer portion G1c of the continuous tube glass G1 to form the plurality of holes H extending in the irradiation direction of the laser light Li by irradiation with the laser light Li. However, needless to say, the present invention is not limited thereto. That is, even when the plurality of holes H are not formed in the surface layer portion G1c through abrasion, any specific means may be used as long as the cracks in the inner crack region C1 can be caused to propagate to the outer peripheral surface G1a.

Further, in the first to third embodiments, the case is described in which the spatial phase modulator is used as the focal point adjusting portion 25, but needless to say, other devices may also be used as the focal point adjusting portion 25. Known optical devices having a focal point adjusting function such as an aspheric lens and various diffraction gratings typified by, for example, a Fθ lens, may be used.

Figure 18:
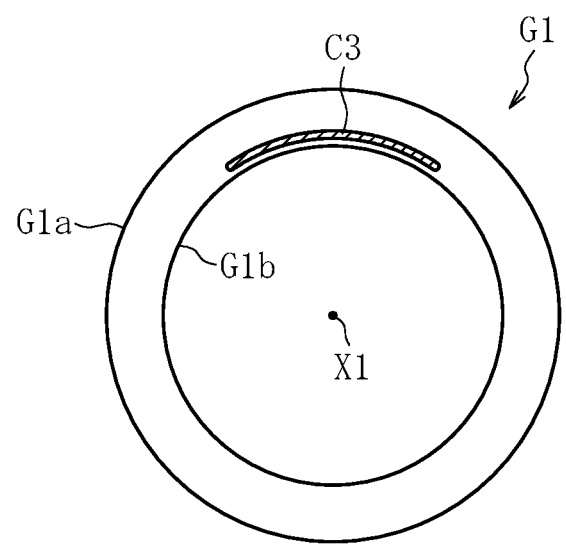
FIG. 18 is a sectional view of a main portion of a tube glass for illustrating a first modification example of the inner crack region of the present invention.

Further, in the first to third embodiments, the case is illustrated in which the inner crack region C1 is formed on the outer periphery side (side close to the outer peripheral surface G1a) of the continuous tube glass G1 in the thickness direction thereof, but needless to say, other modes may also be adopted. FIG. 18 is a sectional view of an inner crack region C3 of one example of the other modes (first modification example). As illustrated in FIG. 18, the inner crack region C3 is formed on a side closer to the inner peripheral surface G1b with respect to the center position of the continuous tube glass G1 in the thickness direction thereof. Even when the inner crack region C3 is formed at such position, the cracks in the inner crack region C3 can be caused to propagate throughout the entire circumference of the continuous tube glass G1 to cut the continuous tube glass G1 by generating an appropriate stress in the continuous tube glass G1.

Figure 19:
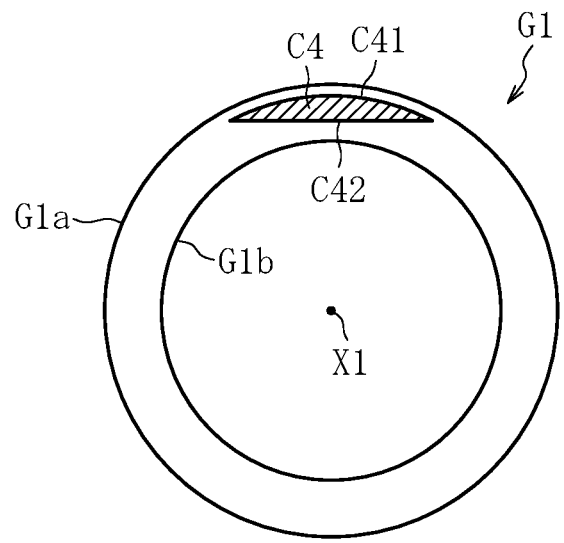
FIG. 19 is a sectional view of a main portion of a tube glass for illustrating a second modification example of the inner crack region of the present invention.

Further, in the first to third embodiments, the case is illustrated in which, as the inner crack regions C1 and C3, the inner crack regions having a constant dimension in the thickness direction (dimension in a direction along a radial direction of the continuous tube glass G1) are formed, but needless to say, other modes may also be adopted. FIG. 19 is a sectional view of an inner crack region C4 according to one example of the other modes (second modification example). As illustrated in FIG. 19, in the inner crack region C4, a large-diameter side C41 (side close to the outer peripheral surface G1a of the continuous tube glass G1) is formed into a substantially arc shape in conformity with the outer peripheral surface G1a, and a radially inner side C42 (side close to the inner peripheral surface G1b of the continuous tube glass G1) is formed into a substantially linear shape. Thus, the dimension of the inner crack region C4 in the thickness direction thereof is reduced from the circumferential center to both circumferential ends. Even when the inner crack region C4 is formed at such position, the cracks in the inner crack region C4 can be caused to propagate throughout the entire circumference of the continuous tube glass G1 to cut the continuous tube glass G1 by generating an appropriate stress in the continuous tube glass G1.

Figure 20:
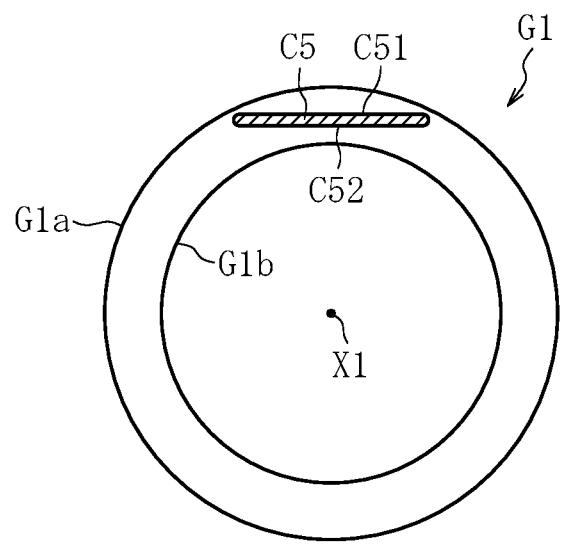
FIG. 20 is a sectional view of a main portion of a tube glass for illustrating a third modification example of the inner crack region of the present invention.

Further, in the first to third embodiments, the case is illustrated in which the inner crack regions C1, C3, and C4 are each formed into a shape in conformity with the outer peripheral surface G1a of the continuous tube glass G1 as a whole, but needless to say, the inner crack regions C1, C3, and C4 may also be formed into other shapes. FIG. 20 is a sectional view of an inner crack region C5 of one example of the other modes (third modification example). As illustrated in FIG. 20, in the inner crack region C5, a radially outer side C51 and a radially inner side C52 are each formed into a substantially linear shape. Further, in the illustrated example, the radially outer side C51 and the radially inner side C52 extend in a direction orthogonal to the radial direction of the continuous tube glass G1. Even when the continuous tube glass G1 is formed into a constant shape irrespective of the shape, the cracks in the inner crack region C5 can be caused to propagate throughout the entire circumference of the continuous tube glass G1 to cut the continuous tube glass G1 by generating an appropriate stress in the continuous tube glass G1.

Further, in the first to third embodiments, the case is illustrated in which the number of each of the inner crack regions C1 and C3 to C5 to be formed in the continuous tube glass G1 is set to one, but needless to say, the present invention is not limited to those embodiments. Any number of the inner crack regions may be formed as long as the inner crack regions are formed in the continuous tube glass G1 to be cut. Although not shown, for example, the following may be performed. Two portions opposed to each other with the center line X1 interposed therebetween are irradiated with the laser light L to form the inner crack regions C1 in the above-mentioned two portions, and the cracks are caused to propagate (the crack propagation region C2 or the secondary crack propagation region C22 is enlarged) in the directions separated from each other from both circumferential ends of each of the inner crack regions C1 to cause the cracks to propagate throughout the entire circumference of the continuous tube glass G1.

Alternatively, although not shown, the following may also be performed. A plurality of dot-like inner crack regions are formed at constant intervals in the circumferential direction or the radial direction, and the cracks in each of the inner crack regions are caused to propagate so as to connect each of the inner crack regions to each other. In any case, any shape and number of the inner crack regions may be adopted as long as the cracks can be finally caused to propagate throughout the entire circumference of the continuous tube glass G1.

Further, in the first to third embodiments, the case is illustrated in which the position of the focal point F (F1, F2, . . . Fn) of the laser light L (L1, L2, . . . Ln) is set to a predetermined position with the focal point adjusting portion 25, but needless to say, other modes may also be adopted. For example, although not shown, the following mode may be adopted. An outer diameter measuring portion configured to measure an outer diameter of the continuous tube glass G1 is arranged on an upstream side of the irradiation region of the laser light L in the continuous tube glass G1, and outer diameter data obtained through measurement with the outer diameter measuring portion is fed back to the focal point adjusting portion 25 to finely adjust the position of the focal point F of the laser light L. With this, even when the outer diameter of the continuous tube glass G1 changes in accordance with the elapsed time after the start of tube drawing forming, the inner crack region C1 can be formed at an appropriate position by adjusting the position of the focal point F of the laser light L to be irradiated in accordance with the change.

Further, in the first to third embodiments, the case is illustrated in which the tensile force f1 in the direction along the center line X1 is applied to the continuous tube glass G1 by gripping the downstream-side end portion of the continuous tube glass G1 to be cut with the gripping portion 30 and moving the gripping portion 30 to the downstream side in the longitudinal direction with the slide drive portion 31, and the predetermined bending force f2 is applied to the continuous tube glass G1 so that the center line X1 of the continuous tube glass 1 is curved at a predetermined curvature by causing the continuous tube glass G1 to pass between the plurality of rollers 32. However, needless to say, one or both of the tensile force f1 and the bending force f2 may be applied to the continuous tube glass G1 with other configurations. In other words, as long as the stress that urges the cracks in the inner crack region C1 to propagate in the circumferential direction of the continuous tube glass G1 can be generated in the continuous tube glass G1, any application structure of an external force (tensile force f1 and bending force f2) may be adopted, and there is no particular limitation on the form of the external force.

Further, it is not necessarily required to apply an external force to the continuous tube glass G1 as long as the stress that urges the cracks in the inner crack region C1 to propagate in the circumferential direction of the continuous tube glass G1 can be generated in the continuous tube glass G1. For example, although not shown, the stress that urges the cracks in the inner crack region C1 to propagate in the circumferential direction of the continuous tube glass G1 may be generated by subjecting a portion of the continuous tube glass G1 in which the inner crack region C1 is to be formed to local heating and cooling.

Further, in the above-mentioned description, the case is illustrated in which, the inner crack region C1 is formed in the portion of the continuous tube glass G1 in the circumferential direction thereof by irradiating the inside of the continuous tube glass G1 with the laser light L having the focal point F adjusted to the inside of the continuous tube glass G1 under a state in which the stress that urges the cracks in the inner crack region C1 to propagate in the circumferential direction of the continuous tube glass G1 is generated in the continuous tube glass G1 in advance. However, needless to say, it is not necessary to limit the formation of the inner crack region C1 to the above-mentioned order. The order may be reversed as long as the stress that urges the cracks in the inner crack region C1 to propagate in the circumferential direction of the continuous tube glass G1 can be generated. That is, in the first to third embodiments, the stress that urges the cracks in the inner crack region C1 to propagate in the circumferential direction of the continuous tube glass G1 may be generated in the continuous tube glass G1 after the inner crack region C1 is formed in the portion of the continuous tube glass G1 in the circumferential direction thereof by irradiation with the laser light L.

Further, in the above-mentioned description, the case is illustrated in which the continuous tube glass G1 illustrated in, for example, FIG. 1 is targeted for cutting to obtain the tube glass product G2 through cutting. However, needless to say, even when other tube glasses are targeted for cutting, the present invention is applicable. For example, although not shown, even when a relatively long tube glass that has already been cut (having end portions on both longitudinal sides) is cut to provide a relatively short tube glass, the present invention is applicable. Needless to say, even when the tube glass obtained through cutting is not a final product, the present invention is applicable.

REFERENCE SIGNS LIST 10 manufacturing apparatus
11 glass melting furnace
12 sleeve
13 drive device
14 muffle furnace
15 annealer
16 tube drawing device
17 cutting device
18 conveyer
20 inner crack region forming device
21 crack propagation device
22 laser oscillator
23 optical system
24 scanning portion 25 focal point adjusting portion
27 objective lens
28 tensile force applying portion
29 bending force applying portion
30 gripping portion
31 slide drive portion
32 roller
33 support portion
C1, C3, C4, C5 inner crack region
C2 crack propagation region
C21 primary crack propagation region
C22 secondary crack propagation region
d inner diameter of hole
F, F', F1, F2, . . . Fn focal point
f1 tensile force
f2 bending force
G1 continuous tube glass
G1a outer peripheral surface
G1c surface layer portion
G2 tube glass product
H hole
L, L1, L2, . . . , Ln laser light
M molten glass
p circumferential pitch of hole
t thickness of surface layer portion
X1 center line
X10 center point
X2 imaginary cross section

The invention claimed is:

1. A method of cutting a tube glass, comprising:
    irradiating the tube glass with laser light having a focal point adjusted to an inside of the tube glass, to thereby form an inner crack region including one or more cracks in a portion of the tube glass in a circumferential direction of the tube glass through multiphoton absorption that occurs in an irradiation region of the laser light; and
    generating, in the tube glass, a stress that urges the one or more cracks in the inner crack region to propagate in the circumferential direction of the tube glass to cause the one or more cracks to propagate throughout an entire circumference of the tube glass, to thereby cut the tube glass.

2. The method of cutting a tube glass according to claim 1, comprising forming the inner crack region on an outer periphery side of the tube glass in a thickness direction of the tube glass.

3. The method of cutting a tube glass according to claim 2, comprising forming the inner crack region into an arc shape in conformity with the tube glass.

4. The method of cutting a tube glass according to claim 3, comprising causing the laser light to perform scanning so that the focal point is included in an imaginary cross section orthogonal to a center line of the tube glass.

5. The method of cutting a tube glass according to claim 2, comprising causing the laser light to perform scanning so that the focal point is included in an imaginary cross section orthogonal to a center line of the tube glass.

6. The method of cutting a tube glass according to claim 2, comprising dispersing the laser light and irradiating a plurality of points of the inside of the tube glass with the dispersed laser light so that each focal point is included in an imaginary cross section orthogonal to a center line of the tube glass.

7. The method of cutting a tube glass according to claim 1, comprising forming the inner crack region into an arc shape in conformity with the tube glass.

8. The method of cutting a tube glass according to claim 7, comprising causing the laser light to perform scanning so that the focal point is included in an imaginary cross section orthogonal to a center line of the tube glass.

9. The method of cutting a tube glass according to claim 1, comprising causing the laser light to perform scanning so that the focal point is included in an imaginary cross section orthogonal to a center line of the tube glass.

10. The method of cutting a tube glass according to claim 1, comprising dispersing the laser light and irradiating a plurality of points of the inside of the tube glass with the dispersed laser light so that each focal point is included in an imaginary cross section orthogonal to a center line of the tube glass.

11. The method of cutting a tube glass according to claim 1, comprising:
    forming the inner crack region in a vicinity of an outer peripheral surface of the tube glass by irradiation with the laser light while leaving a surface layer portion including the outer peripheral surface;
    causing the one or more cracks in the inner crack region to propagate to the outer peripheral surface; and
    causing the one or more cracks to propagate throughout the entire circumference of the tube glass with a stress that urges the one or more cracks to propagate in the circumferential direction of the tube glass.

12. The method of cutting a tube glass according to claim 11, comprising generating abrasion in the surface layer portion to form a plurality of holes extending in an irradiation direction of the laser light by irradiation with the laser light, and adjusting a circumferential interval between the plurality of holes, to thereby cause the one or more cracks in the inner crack region to propagate to the outer peripheral surface so as to connect the plurality of holes to each other.

13. The method of cutting a tube glass according to claim 12, comprising setting a circumferential pitch between the plurality of holes to 1.5 times or more and 5.0 times or less an inner diameter of the holes.

14. The method of cutting a tube glass according to claim 11, comprising setting a thickness of the surface layer portion to 20 μm or less.

15. The method of cutting a tube glass according to claim 1, comprising irradiating the tube glass with the laser light having a focal point adjusted to an inside of the tube glass under a state of generating, in the tube glass, a stress that urges the one or more cracks in the inner crack region to propagate in the circumferential direction of the tube glass, to thereby form the inner crack region in the portion of the tube glass in the circumferential direction.

16. The method of cutting a tube glass according to claim 1, comprising applying a tensile force to the tube glass in a direction along a longitudinal direction of the tube glass, to thereby generate the stress that urges the one or more cracks to propagate in the circumferential direction of the tube glass.

17. The method of cutting a tube glass according to claim 1, comprising applying a bending force to the tube glass so that the center line of the tube glass is curved with a predetermined curvature, to thereby generate the stress that urges the one or more cracks to propagate in the circumferential direction of the tube glass.

18. The method of cutting a tube glass according to claim 1, comprising subjecting a portion of the tube glass in which the inner crack region is formed to local heating and cooling, to thereby generate the stress that urges the one or more cracks to propagate in the circumferential direction of the tube glass.

19. An cutting device for a tube glass, comprising:

an inner crack region forming device configured to irradiate the tube glass with laser light having a focal point adjusted to an inside of the tube glass, thereby being capable of forming an inner crack region including one or more cracks in a portion of the tube glass in a circumferential direction of the tube glass through multiphoton absorption that occurs in an irradiation region of the laser light; and a crack propagation device configured to generate, in the tube glass, a stress that urges the one or more cracks in the inner crack region to propagate in the circumferential direction of the tube glass, to thereby cause the one or more cracks to propagate throughout an entire circumference of the tube glass.

20. A method of manufacturing a tube glass, comprising cutting a continuous tube glass subjected to tube drawing forming in a cutting step provided during conveyance of the continuous tube glass to provide a tube glass product, the method comprising:

irradiating the continuous tube glass with laser light having a focal point adjusted to an inside of the tube glass, to thereby form an inner crack region including one or more cracks in a portion of the continuous tube glass in a circumferential direction of the tube glass through multiphoton absorption that occurs in an irradiation region of the laser light; and generating, in the continuous tube glass, a stress that urges the one or more cracks in the inner crack region to propagate in the circumferential direction of the continuous tube glass to cause the one or more cracks to propagate throughout an entire circumference of the continuous tube glass, to thereby cut the continuous tube glass to provide a tube glass product.

* * * * *